United States Patent [19]

Shenk et al.

[11] 4,178,087
[45] Dec. 11, 1979

[54] AUTOFOCUS MOVIE CAMERA HAVING FOCUS CORRECTION MEANS

[75] Inventors: Edwin K. Shenk, Westford; Shirley Y. Tam, Arlington, both of Mass.

[73] Assignee: Polaroid Corporation, Cambridge, Mass.

[21] Appl. No.: 947,774

[22] Filed: Oct. 2, 1978

[51] Int. Cl.² .............................................. G03B 3/10
[52] U.S. Cl. .................................................. 354/195
[58] Field of Search ........................ 354/25, 195, 198; 352/140; 355/56

[56] References Cited

U.S. PATENT DOCUMENTS

| | | | |
|---|---|---|---|
| 3,370,289 | 2/1968 | Hedgcock et al. | 340/347 |
| 3,949,287 | 4/1976 | Wagensonner et al. | 318/640 |
| 3,963,970 | 6/1976 | Satake | 354/44 X |
| 4,002,405 | 1/1977 | Stahl | 354/195 X |
| 4,065,778 | 12/1977 | Harvey | 354/25 |
| 4,066,347 | 1/1978 | Wagensonner | 352/141 |

*Primary Examiner*—Michael L. Gellner
*Attorney, Agent, or Firm*—John J. Kelleher

[57] ABSTRACT

The operational range of an adjustable focus lens is subdivided into a plurality of focus zones, of finite size, by a lens control system that produces a plurality of discrete signals representative of said focus zones, said control system utilizing bidirectional drive means to position the movable element of said lens to one of said focus zones from any position within said operational range in order to focus an image of a remote object at an image plane. The present invention equalizes and minimizes the focusing error introduced into said lens control system resulting from the use of such focus zones with bidirectional drive means, by utilizing electrodynamic braking to arrest lens movement within a predetermined portion of a focus zone, once said lens has entered said zone to focus an image of said remote object at said image plane.

12 Claims, 4 Drawing Figures

AUTOFOCUS MOVIE CAMERA HAVING FOCUS CORRECTION MEANS

BACKGROUND OF THE INVENTION

1. Field of the Invention

The present invention relates to an automatic focusing system for an adjustable focus lens camera in general, and to such a system having reversible drive means, in particular.

2. Description of the Prior Art

Control systems for automatically positioning the movable element of an adjustable focus lens to a desired focus position in order to properly focus an image of a remote object at the image plane of a photographic camera in response to a signal representative of the distance to said remote object, have been disclosed in the prior art. Control systems that divide the entire operational range of an adjustable focus lens into a plurality of discrete focus zones by generating a plurality of discrete signals (one discrete signal for each focus zone) in order to so focus an adjustable focus lens, have also been disclosed in the prior art.

Prior art control systems having reversible drive means are capable of automatically moving the movable element of an adjustable focus lens in either of two directions to a particular focus zone (as described above) and stopping lens element movement as soon as said lens element reaches said focus zone. If the movable lens element is stopped as soon as it reaches an appropriate focus zone, as determined by a focus zone signal corresponding to said focus zone, said lens element can be positioned to at least two different focus positions for the same focus zone signal, the particular position being dependent upon the end of the focus zone that is entered by said movable lens element. This can result in a lens element positioning differential or focusing error as large as the width of a discrete focus zone.

One fairly common technique for reducing the aforementioned focusing error is to reduce the width of each focusing zone by increasing the total number of focusing zones that collectively represent the entire adjustable focus lens operational range. While this technique does reduce focusing error as discussed above, it does so by increasing the complexity of the automatic focus control system that positions the adjustable focus lens to the appropriate focus zone. For example, increasing the number of discrete focus zones would normally increase the total number of binary coded bits in a digital control system that would be needed to define the additional focus zones for proper automatic focus control system operation. Another technique that might be utilized to reduce focusing error is a ratchet and pawl arrangement where a pawl engages and arrests the movement of a ratchet that is mounted on and rotates with the movable element of an adjustable focus lens. While this type of arrangement would reduce focusing errors of the type described above, such an arrangement often breaks down and is relatively complex and expensive.

SUMMARY OF THE INVENTION

In accordance with a preferred embodiment of the present invention, a digital control system having reversible drive means for focusing the adjustable focus lens in a photographic camera is provided with simple and inexpensive means for reducing the focusing error inherent in a control system of this type. In such a control system, the entire operational range of said adjustable focus lens is divided into a plurality of discrete focus zones that are greater than some minimum width by generating a plurality of discrete signals, one such signal for each focus zone. Focusing error can be as large as the width of a particular focus zone. Focusing error results from the fact that the digital control system assumes that the lens is properly focused so long as it is positioned anywhere within a particular focus zone. The present invention minimizes and continues to equalize the focusing error inherent in a digital control system having reversible lens drive means by utilizing said reversible drive means to arrest lens movement at a position that is significantly less than one-half the width of a focus zone away from the center of a particular focus zone, said position normally being one-sixth of the width of said focus zone, or less, away from said focus zone center.

DESCRIPTION OF THE PREFERRED EMBODIMENTS

Figure 1:
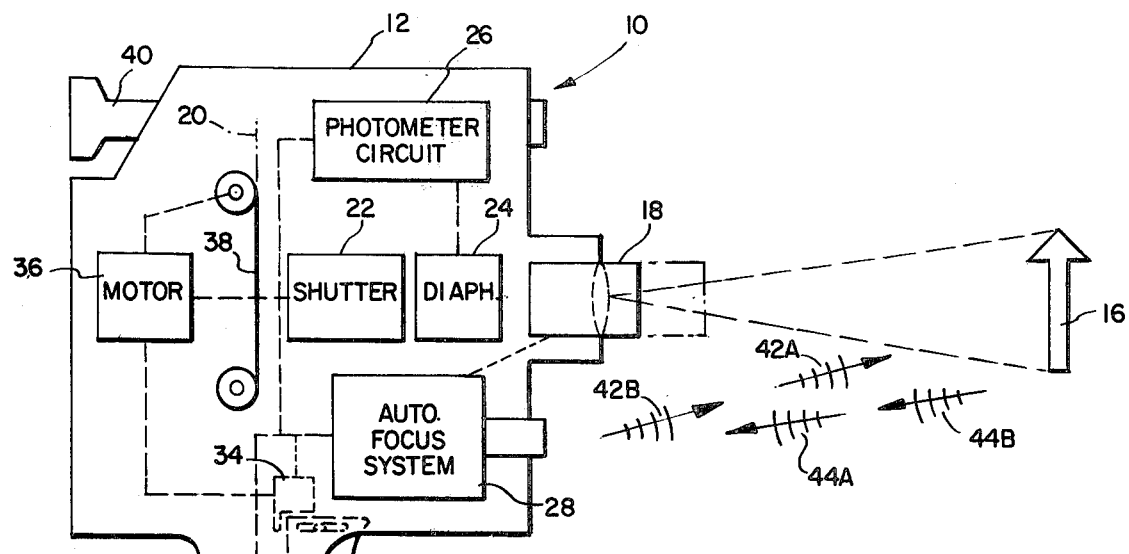
FIG. 1 is a side view, in elevation, of an adjustable focus lens motion picture camera incorporating the inventive concept of the present invention.

Referring now to the drawings and, specifically, to FIG. 1, a schematic diagram of automatic focusing camera 10 constructed in accordance with a preferred embodiment of the present invention, is depicted. Camera 10 comprises a housing 12 having handle 14 projecting from the bottom thereof by which a user holds said camera 10 to photograph subject 16 through adjustable focus lens mount 18 which directs scene light to image plane 20 when shutter mechanism 22 is operated. Diaphragm 24 associated with shutter mechanism 22, in conjunction with lens mount 18, establishes the instantaneous amount of light incident on image plane 20. The opening of diaphragm 24 is controlled by photometer circuit 26 in response to available scene light.

Mounted within said housing 12 is automatic focusing system 28 which, when activated, is responsive to the distance to subject 16 from camera 10, and to changes in said distance for adjusting the focus position of lens mount 18 in order to maintain an image of subject 16 in focus at image plane 20. Switch 30, which is mounted in camera handle 14 and is connected to an energy source (not shown), controls the operation of photometer circuit 26 and automatic focus system 28 in response to a minimum amount of pivotal movement of actuator 32 as the handle 14 is engaged by the heel of a user's hand when holding camera 10 in position to record a scene. Additionally, switch 30 couples said energy source (battery) to motor run switch 34 to permit scene recording as explained below.

Housing 12 also contains motor 36 which, when energized through motor run switch 34 by depressing trigger 35, simultaneously operates shutter 22 and a film indexing claw (not shown) which intermittently drives film 38 past an image recording station located behind shutter 22. Finally, a viewfinder 40 is provided to enable a camera user to frame the scene being filmed.

In the operation of camera 10, the user grasps handle 14 and frames subject 16 by means of viewfinder 40. As the user holds handle 14, switch 30 is closed by the movement of actuator 32 thereby powering photometer circuit 26 and automatic focus system 28. Photometer circuit 26 establishes the proper diaphragm opening in accordance with the amount of light in the scene being photographed while automatic focus system 28 ultrasonically determines the distance to subject 16 and then focuses adjustable focus lens mount 18 such that the lens system in said lens mount 18 focuses an in-focus image of subject 16 at image plane 20 when shutter 22 is activated to the open position. The distance to subject 16 is determined by measuring the time it takes for an ultrasonic burst of energy to travel from autofocus system 28 to subject 16 and to be reflected back to said autofocus system 28 from said subject 16. Reference numerals 42a and 42b designate sequential ultrasonic bursts of energy being transmitted toward subject 16 and reference numerals 44a and 44b designate the reflection of these ultrasonic bursts of energy from subject 16 toward autofocus system 28. In this particular ultrasonic focusing system, an ultrasonic burst of energy is transmitted and an echo of said transmitted burst of ultrasonic energy is received before a subsequent burst of range determining ultrasonic energy is transmitted. The ultrasonic rangefinder portion of autofocus system 28 is described in greater detail in copending U.S. patent application Ser. No. 916,114, by SHENK.

As discussed above, autofocus system 28 determines the time interval between the transmission of an ultrasonic burst of energy 42a and the return of its echo 44a for the purpose of determining the distance to subject 16 from camera 10. Having established this distance, system 28, when permitted to do so, moves lens mount 18 toward a focus position in which an image of subject 16 will be in focus at focal plane 20 when shutter 22 is activated. As mentioned briefly above, activation of shutter 22 is selectively carried out when the user depresses trigger 35 thereby closing switch 34 and powering motor 36. Autofocus system 28 remains in operation so long as the user maintains his grasp of the handle 14, and is effective to continuously determine subject range and to cause lens mount 18 to track changes in subject distance both prior to and during filming.

Figure 2:
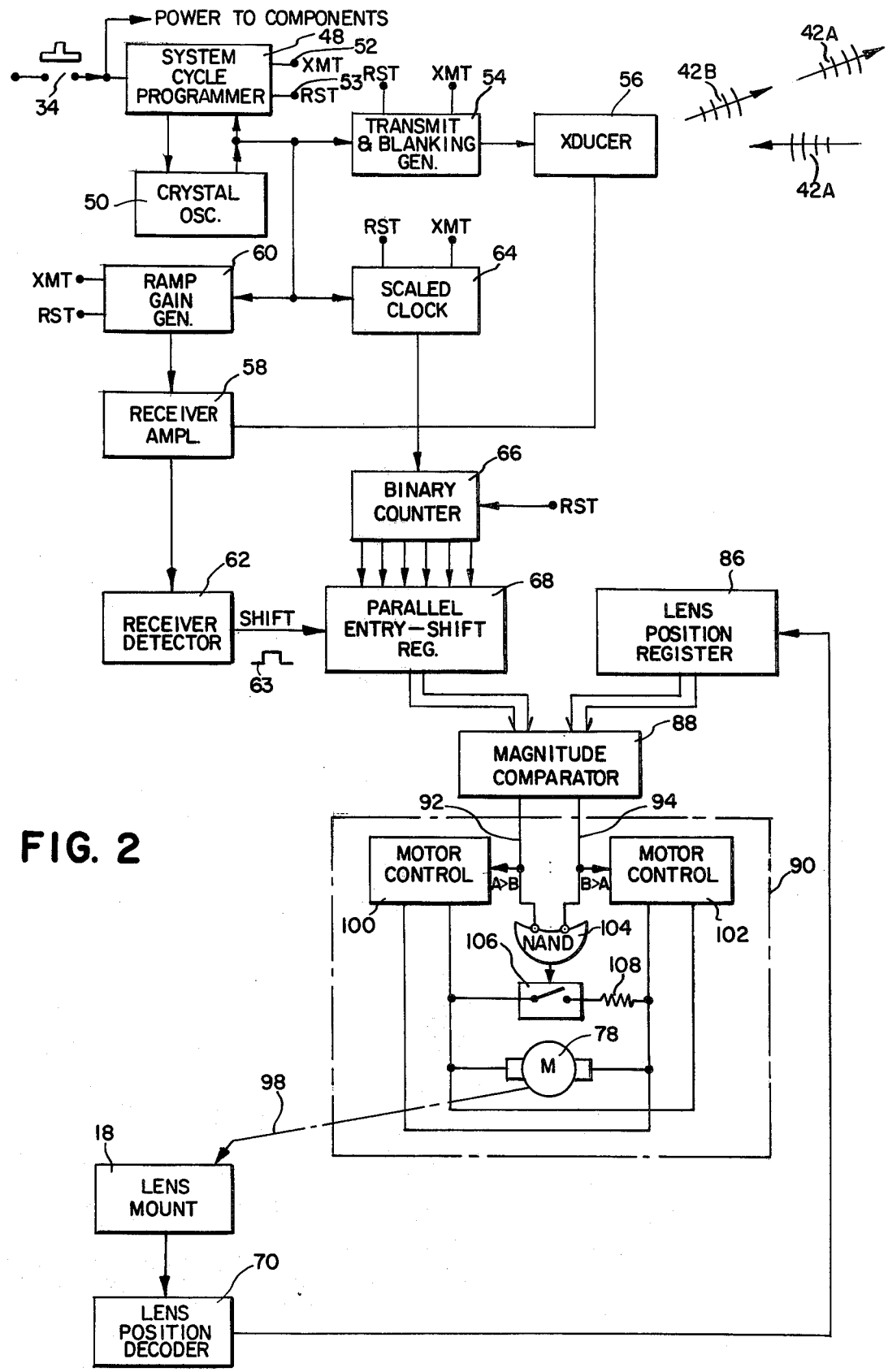
FIG. 2 is a block diagram of a preferred embodiment of the focusing error reducing control system of the present invention.

Certain details of automatic focus system 28 are shown in FIG. 2, to which reference is now made. When switch 34 is closed, power is applied to the components of autofocus system 28 (FIG. 1) which causes system cycle programmer 48 to divide-down the high frequency output of oscillator 50 into a transmit and reset pulse train having the same pulse repetition frequency,, but shifted in phase. Transmit pulses produced at output 52 are designated XMT. The reset pulses produced at output 53 and designated RST, are the same as the XMT pulses, but are delayed with respect to the XMT pulses by about 50 ms, which is greater than the round trip time for sonic energy, under normal conditions of temperature and pressure, for subjects at a distance of about 24 feet from the camera 10 (FIG. 1) which represents the hyperfocal lens position of the lens system mounted in lens mount 18 (FIG. 1). This arrangement will allow any echo from a subject within 24 feet of said camera to be received by system 28 in the time interval between successive RST pulses.

Transmit and blanking generator 54, to which the XMT pulses and the output of oscillator 50 are applied, operates similar to the corresponding component in the ultrasonic ranging system disclosed in copending application Ser. No. 840,802, filed Nov. 11, 1977, in the name of JUERG MUGGLI, which causes transducer 56 to transmit periodic ultrasonic bursts of energy, two of which are illustrated at 42a and 42b. An echo from a subject due to ultrasonic burst of energy 42a, indicated at 44a, is received by transducer 56 where the echo, in the form of an electrical signal, is routed to receiver amplifier 58 in the manner described in the above-mentioned MUGGLI application. Amplifier 58 has a ramp gain characteristic controlled by ramp gain generator 60 to increase the sensitivity of autofocus system 28 to distant subjects. The output of amplifier 58 is detected by receiver detector 62 to produce an echo pulse 63 such that the time between a transmit pulse and its associated echo pulse is proportional to the distance between a subject and camera 10.

This above-noted time interval is utilized in conjunction with scaled clock 64 to establish a number representative of the desired focus position for lens mount 18. The output of scaled clock 64 is a train of pulses whose pulse repetition frequency varies with time in accordance with the derivative of the lens/subject function of the lens system associated with lens mount 18. The output of scaled clock 64 is integrated by accumulating the pulses produced by said scaled clock, in binary counter 66: the contents of counter 66 at any instant in time represents the integral of the time derivative of the lens/subject function evaluated from the time of transmit pulse XMT to said instant in time. Consequently, the contents of counter 66, when echo pulse 63 occurs, is a definite integral of the time derivative of the lens/subject function of the lens system associated with lens mount 18, which is a number representing the desired focus position of said lens mount 18 for a subject whose distance is determined by the time interval between transmit pulse XMT and echo pulse 63.

By means of receiver detector 62, echo pulse 63 triggers parallel entry-shift register 68 causing the shifting of the contents of counter 66, at the instant of echo pulse 63, into shift register 68. Shortly after echo pulse 63 occurs, reset pulse RST appears at output 63 of system cycle programmer 48 thereby resetting scaled clock 64, binary counter 66, ramp gain generator 60 and transmit and blanking generator 54. The condition of autofocus system 28 is now such that upon the generation of the next ultrasonic burst of energy in response to transmit and blanking generator 54 and the next transmit pulse XMT from system cycle programmer 48, the cycle of operation described above will be repeated so that, upon the generation of the next echo pulse 63, the contents of counter 66 will again be shifted into register 68. As a consequence, the number in register 68 repeatedly varies in response to changes in subject distance at a rate dependent upon the pulse repetition rate of transmit pulse XMT.

Figure 3:
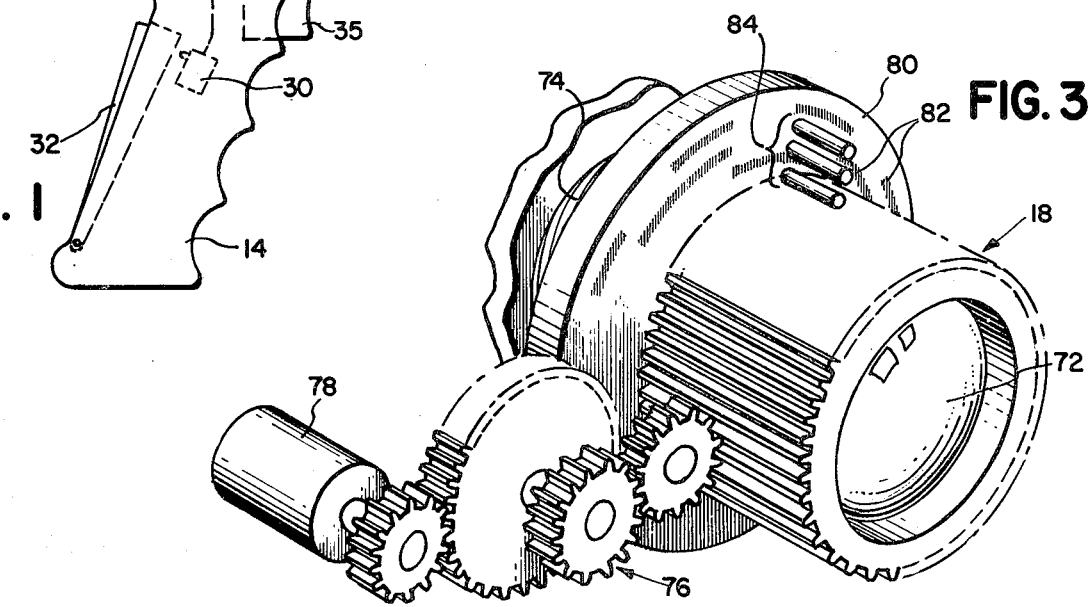
FIG. 3 is a perspective view of the adjustable focus lens, lens mount and reversible lens drive motor of the motion picture camera depicted in FIG. 1 showing the means for encoding the angular and therefore the focus position of the movable element of said adjustable focus lens.

For determining the actual position of lens mount 18, lens position decoder 70 is provided and is described in detail with respect to FIG. 3. Reference is now made to FIG. 3 which shows the preferred form of lens position decoder 70. As shown in FIG. 3, lens mount 18 carrying objective lens 72 is rotatably mounted on threaded member 74 carried by camera housing 12 so that rotational movement of lens mount 18 causes axial displacement of lens 72. Actually, the pitch of member 74 is selected such that considerably less than 360° is required to displace lens 72 from its extreme close-up axial position to its infinity or hyperfocal axial position. In order to rotate lens mount 18, a gear train 76 is interposed between the motor 78 and the gear teeth carried by the periphery of the mount for objective lens 72. A slip clutch connection (not shown) is interposed between motor 78 and lens mount 18 to permit overrunning of the motor in the event of a jam or engagement of the lens mount with an axial movement limiting stop at either end of lens mount travel. Projecting from and rotatable with the movable portion of lens mount 18 is encoder disc 80, carrying shaft encoding indicia 82 in the form of binary coded slots that pass completely through said disc 80. Encoding indicia 82 are preferably in the form of a gray code. However, for ease of description, a standard three-bit binary code is utilized. Operatively associated with indicia 82 are three photocells 84 and three light sources (not shown). The light path between a light source and its associated photocell is blocked and unblocked by slotted encoder disc 80 as said disc is rotated through said light path. The output of each photocell provides one bit of information on the angular and therefore the axial position of the movable element of lens mount 18. The slots in disc 80 and their relationship to photocells 84 are shown in greater detail in FIG. 4.

Figure 4:
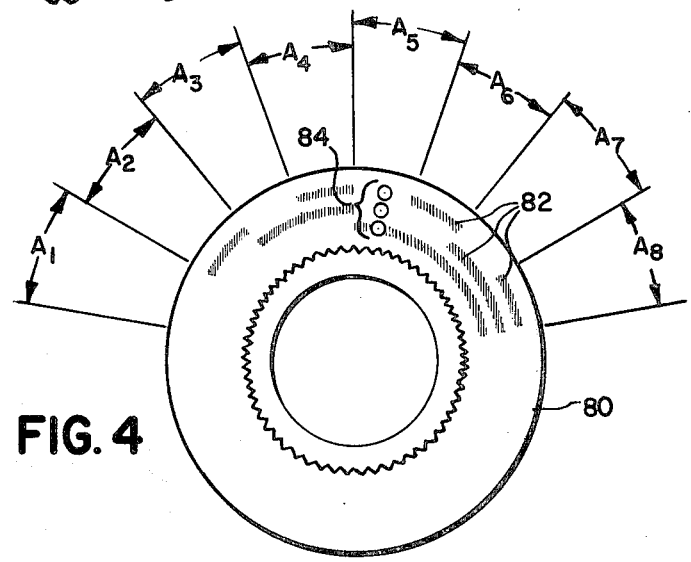
FIG. 4 is a front elevational view of the lens mount for the movable element of the adjustable focus lens depicted in FIG. 3, showing a three bit binary code on a disc projecting from said lens mount, said code defining eight discrete focus zones of said adjustable focus lens.

FIG. 4 is a front elevational view of the movable element lens mount 18 of the adjustable focus lens depicted in FIG. 3, showing a three-bit binary code on encoder disc 80 projecting from said lens mount, said code defining eight address locations or discrete focus zones of said adjustable focus lens. The eight focus zones are designated $A_1$ thru $A_8$, said focus zones corresponding to the numbers 0 through 7, respectively, in binary code. The $A_1$ thru $A_8$ focus zones are shown extending over 160° of movable lens element rotation. However, this range of angular movement is by design choice and said movement range could extend to 360° or substantially less than the 160° shown.

For proper photocell operation, the angular length of slots 82 must be greater than some minimum size. Because of this requirement, the minimum number of degrees of lens mount 18 (FIG. 3) rotation that can be detected by a photocell is directly proportional to the angular length of slots 42; the smaller the angular length, the smaller the number of degrees of rotation that can be detected. As a consequence of not being able to detect lens angular movement less than some minimum value, prior art automatic focus control systems having reversible adjustable focus lens drive means that subdivide the complete operational range of an adjustable focus lens into a plurality of focus zones will cause a lens positioning or focusing error as large as the width of a focus zone when said lens is moved in two different directions to the same focus zone. The deviation from the center of a particular focus zone would be independent of the end of the particular focus zone entered by such a lens. However, if one end of a focus zone is used as a reference point, the focus error in this sense would be equal to the width of a focus zone.

Prior art focus control systems stop the lens as soon as a lens position signal generated by a photocell indicates that the lens had reached the proper focus position. This signal would be generated as soon as the lens entered either end of a particular focus zone which means that there are at least two different positions within a particular focus zone that would appear to be the same position to such a prior art control system. The automatic focus control system of the present invention significantly reduces the error as defined above resulting from such an arrangement while continuing to make the deviation from the center of a particular focus zone independent of the direction that the lens is moved to enter said particular focus zone. The error reducing arrangement of the present invention that is incorporated into automatic focus system 28 (FIG. 1) is described below with reference to FIG. 2.

Turning again to FIG. 2, the output of lens position decoder 70 is applied to lens position register 86 which constitutes means responsive to the position of said lens mount 18 for generating a number representative of the actual position of said lens mount. Continuing now with the operation of the embodiment of FIG. 2, parallel entry/shift register 68 is a first register of autofocus system 28 (FIG. 1) and stores a number representative of the desired focus position for lens mount 18, the contents of this first register varying in response to changes in subject distance at a rate dependent on the pulse repetition rate of the transmit pulses as previously discussed. Lens position register 86 constitutes a second register of autofocus system 28 (FIG. 1) which stores a number representative of the actual position of lens mount 18, the contents of register 86 varying in response to changes in lens mount 18 position at a rate determined by the rate of change of lens mount 18 position. The rate of change of the contents of register 86 is thus independent of the rate at which the contents of register 68 are updated.

The contents of registers 68 and 86 are compared in magnitude comparator 88 to determine, on a continuous basis, which register contains the larger number. Since each register number is based on the same reference (i.e., the desired focus position and the actual lens position are measured from the same reference point), the contents of the registers will be equal when the actual position of lens mount 18 corresponds to the desired focus position for said lens mount 18. When the contents of one register exceeds the other, the actual position of lens mount 18 will be displaced from its last focus position by an amount equal to the difference between the contents of each such register. Whether the actual position of lens mount 18 is on one side or the other of the desired focus position will depend upon which register contains the larger number. With knowledge of the existence of a difference in contents as well as identification of the register with the larger number, drive means 90 is responsive to the output of magnitude comparator 88, causing lens mount 18 to track changes in subject distance.

Comparator 88 has first and second output terminals 92 and 94. A signal appears on first terminal 92 only when the number in first register 68 exceeds the number in second register 86. If the numbers in the registers are designated A and B, then a signal will appear on terminal 92 ehen $A > B$. Ordinarily, a signal will appear on second terminal 94 only when the reverse relationship between the magnitudes occurs, namely $B > A$.

Drive means 90 include reversible drive motor 78 operatively associated with lens mount 18 through mechanical connection 98, a forward motor control 100 and a reverse motor control 102. The forward motor control 100 is responsive to a signal on first terminal 92 for operating motor 78 in one direction to thereby move the lens mount in one direction so as to increase the number in register 86 and thereby tend to null the signal on terminal 92. Whether or not a null condition is actually reached depends upon what is concurrently happening to the contents of register 68. This, of course, depends upon changes in subject distance.

Similarly, a signal on second terminal 94 causes reverse motor control 102 to operate motor 78 in the opposite direction, thereby moving the lens mount in the opposite direction to thereby decreaase the number in register 86. This particular movement should tend to nullify the signal on terminal 94 if the subject remains stationary. When no signal appears on either terminal 92 or terminal 94, neither controls 100 nor 102 are operated and motor 78 remains stationary. As indicated above, this condition exists when the actual and desired focus positions for lens mount 18 are the same.

As subject distance changes, the time intervals between successive transmit pules XMT and echo pulses 63 change in direct relationship thereby causing shifting of the contents of counter 66 into register 68 at a different point in time measured from the beginning of each initiation of the operation of scaled clock 64. The number in register 68 thus changes and the output of comparator 88 reflects this change, causing motor controls 100 or 102 to operate in such a manner as to reduce the difference between the contents of registers 68 and 86 as the actual position of lens mount 18 approaches the desired focus position for said lens mount 18.

As discussed above with reference to FIG. 4, the angular length of slots 82 must be greater than some minimum size for proper encoder disc 80/photocells 84 operation which results in a lens positioning or focusing error when said lens is positioned to a particular focus zone, as defined above, from two different directions. This potential focusing error is substantially reduced by utilizing the lens focusing system of the present invention. With continued reference to FIG. 2, signals appearing on terminals 92 and 94 will also appear at the input to NAND gate 104. NAND gate 104 will conduct when signals are absent from terminals 92 and 94. When NAND gate 104 conducts, switching means 106, having both open and closed positions, is thereby actuated to its closed position which places impedance 108 directly across the input terminals of reversible drive motor 78.

Under normal conditions, motor 78 would be driving lens mount 18 to the desired focus zone immediately prior to the time that NAND gate 104 is rendered conductive. When NAND gate 104 is subsequently rendered conductive by the absence of any signals on terminals 92 and 94, neither motor control 100 nor motor control 102 will be sending a motor drive signal to reversible drive motor 78. Motor control 100 or motor control 102 will terminate a motor drive signal to drive motor 78 as soon as lens mount 18 reaches one end or the other of the focus zone in which the lens associated with said lens mount 18 is in focus. When lens mount 18 reaches the focus zone where an image of a particular subject is in focus at image plane 20 (FIG. 1) of camera 10 (FIG. 1), and impedance 108 has been placed across the input terminals of de-energized, but rotating direct current (d.c.) reversible motor 78, said d.c. motor 78 is converted into a rotating d.c. generator with an electrical load on its output terminals which, in this instance, is impedance 108. The presence of an impedance at the output of a rotating generator results in a braking force being applied to converted drive motor 78. This type of braking is commonly referred to as electrodynamic braking and this braking technique is well known and well understood in the prior art. With this type of braking, it is possible to select a value of impedance for impedance 108 that will arrest drive motor 96 and therefore lens mount 18 movement at the midpoint of a particular discrete focus zone. However, due to variations in the drive motor power supply (not shown), friction associated with drive means 90, etc., over an extended period of time, the attempted movement of lens mount 18 to the midpoint of a particular focus zone by drive motor 96, is not always successful. This particular shortcoming notwithstanding, the autofocus system of the present invention will position lens mount 18 fairly close to a focus zone midpoint even if it cannot always reach said midpoint, which will substantially reduce the positioning or focusing error of the adjustable focus lens associated with lens mount 18 over other autofocus systems that subdivide the complete operational range of an adjustable focus lens into a plurality of discrete focus zones for adjustable focus lens focusing. Not only will the deviation from a focus zone midpoint be minimized by the present arrangement, the magnitude of said minimized deviation from said midpoint will be independent of the direction in which the lens was moving when it enters said particular focus zone during a filming sequence.

GENERAL CONSIDERATIONS

Switching means 106 schematically depicted in FIG. 2 and referred to in the description of the preferred embodiment may be of the solid state or electromechanical (relay) type so long as the switching time of either type switching means is short enough to enable impedance 108 and drive motor 78 to interact with each other and to provide the requisite electrodynamic braking of lens mount 18.

The term "adjustable focus lens operational range" as used herein means the range over which an adjustable focus lens is actually focused by an autofocus system and said range may be equal to or less than the maximum focusing range capability of said adjustable focus lens.

Some prior art control systems may arrest adjustable focus lens movement after the lens has moved slightly within a particular focus zone, as defined herein, merely because of the inability of a control system to overcome the inertia of a moving lens in time to stop said lens at a precise point. The present invention is concerned with arresting lens movement at a predetermined point within a particular focus zone and not with those control system arrangements where the movement of an adjustable focus lens into said particular focus zone is incidental and/or insignificant.

It will be apparent to those skilled in the art from the foregoing description of our invention that various improvements and modifications can be made in it without departing from its true scope. The embodiments described herein are merely illustrative and should not be viewed as the only embodiments that might encompas our invention.

What is claimed is:

1. In an autofocusing camera having a displaceable lens,
   means for determining subject distance,
   control means energizeable for displacing said lens to a location selected in accordance with said distance determining means to thereby focus an image of the subject on the camera focal plane,
   said control means including encoder means responsive to lens displacement for producing a plurality of discrete signals, each representative of displacement of said lens to within a respective positional zone of said lens, and
   said control means including means for terminating displacement of said lens when a predetermined signal is produced corresponding to location of said lens within a positional zone selected in accordance with said distance determining means, the improvement comprising:
   that said displacement terminating means includes means responsive to said predetermined signal for terminating displacement of said lens following production of said predetermined signal at a lens location one-third to one-half the width of said positional zone whereby said lens is arrested close to the center of said positional zone regardless of the direction of lens travel into said positional zone.

2. The apparatus of claim 1, wherein said control means comprises:
   a first register for storing a number representative of the desired focus position for said lens;
   a second register for storing a number representative of the actual focus position of said lens;
   a comparator for comparing the contents of said first and second registers and for generating a signal representative of the distance and the direction that said displaceable lens must be moved to make the contents of said first and second registers equal;
   a reversible electric motor that is responsive to said comparator distance and direction signal; and
   switch means for converting said motor to a generator and connecting a lens motion arresting impedance across the output of said generator when the magnitude of said comparator signal has been reduced to zero.

3. The apparatus of claim 2, wherein said switch means is an electromagnetic relay.

4. The apparatus of claim 2, wherein said switch means is a solid-state switching device.

5. The apparatus of claim 2, wherein said electrical motor is of the direct current type.

6. In a photographic camera of the type having,
   means for selectively coupling said camera to a source of energy,
   an image plane,
   an adjustable focus lens mounted for displacement over a given operational range where it serves to focus images of subjects positioned within a range of subject distances at said image plane,
   means for producing a signal indicative of the position of a particular subject within said range of subject distances,
   means for producing a plurality of discrete focus zone signals that collectively represent the entire operational range of said adjustable focus lens,
   drive means for effecting movement of said lens from either of two directions to focus an image of a particular subject at said image plane;
   the improvement comprising:
   means for arresting lens movement within a predetermined portion of the lens focusing movement corresponding to the total movement possible for a particular discrete focus zone signal, once said lens enters that portion of its operational range corresponding to said particular signal, thereby reducing the lens positional error regardless of the direction of lens travel into that portion of the operational range of sid lens corresponding to said particular signal.

7. The apparatus of claim 6, wherein said drive means includes a reversible electric motor and said lens movement arresting means includes means for converting said reversible motor to an electrical generator and connecting the output of said generator to an impedance whose magnitude is such that lens movement is arrested within said predetermined portion of the total movement possible for said particular discrete focus zone signal.

8. The apparatus of claim 7, wherein the magnitude of said impedance is chosen such that movement of said lens is arrested one-sixth of the width of a particular focus zone or less away from the center of said particular focus zone.

9. The apparatus of claim 7, wherein the magnitude of said impedance is chosen such that movement of said lens is arrested at the midpoint of said particular focus zone.

10. The apparatus of claim 7, wherein said means for converting said motor to an electrical generator and connecting the output of said electrical generator to an impedance is an electromagnetic relay.

11. The apparatus of claim 7, wherein said means for converting said motor to an electrical generator and connecting the output of said electrical generator to an impedance is a solid-state switching device.

12. The apparatus of claim 7, wherein the reversible electric motor included in said drive means is of the direct current type.

* * * * *